July 12, 1938.  P. Q. WILLIAMS  2,123,549

VACUUM CUP

Filed April 23, 1936

Inventor
Percy Q. Williams
By Faust F. Crampton
Attorney

Patented July 12, 1938

2,123,549

UNITED STATES PATENT OFFICE 2,123,549

VACUUM CUP

Percy Q. Williams, Toledo, Ohio

Application April 23, 1936, Serial No. 76,023

3 Claims. (Cl. 248—363)

My invention has for its object to provide a vacuum cup having a plurality of surface engaging and sealing lips or ridges for insuring maintenance of a large area of differential pressure on opposite surfaces of the cup.

The invention also has for its object to provide a vacuum cup having a peripherally disposed shelter lip for preventing entrance of moisture within the low pressure area of the cup. The lip is of particular advantage when vacuum cups are subjected to unfavorable weather conditions, such as rain or sleet, or when water or other liquids wash over the cups, as may occur when cleaning the objects to which the cups are pneumatically attached. Ordinarily when vacuum cups are exposed to moisture, the low pressure within the cups tends to draw the moisture into the vacuous region which reduces the degree of vacuity, and the cups, or pressure reducing systems that may be connected to the cups, are rendered less effective. The entrance of moisture between the sealing edge of the cup and the supporting surfaces reduces the frictional resistance to lateral movements of the cup relative to its supporting surface.

The invention may be contained in vacuum cups of different forms that may be used for different purposes. The construction of the vacuum cups containing my invention may be varied in its details. To illustrate a practical application of my invention, I have selected, as an example of the various structures that contain my invention, a vacuum cup that is particularly adapted to attaching a luggage rack to the surface of a part of the body of an automobile, such as the top. The vacuum cup selected as an example is illustrated in the accompanying drawing and is described hereinafter.

Figure 1:
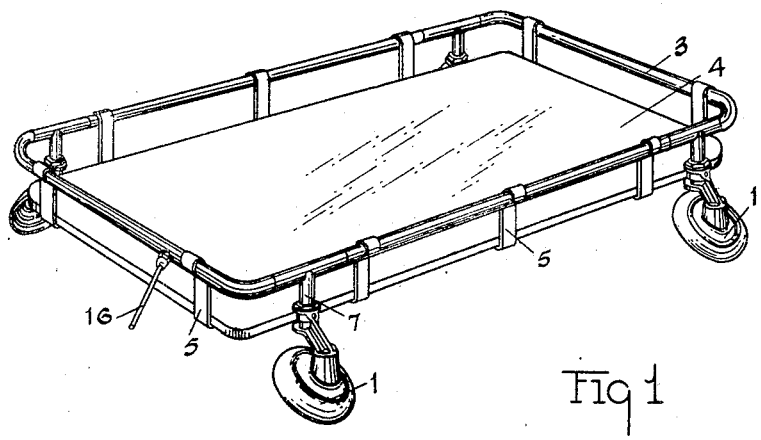
Figure 2:
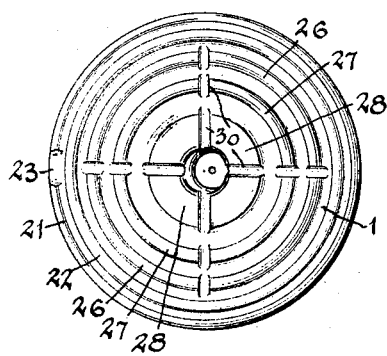
Figure 3:
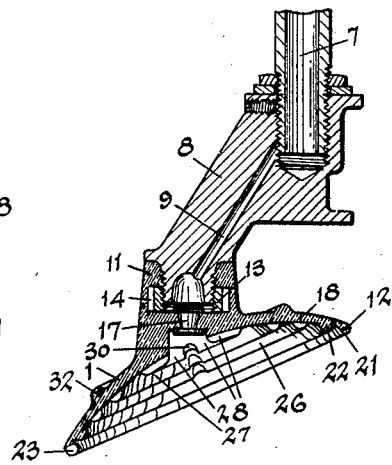

Fig. 1 illustrates a perspective view of a luggage rack to which vacuum cups embodying my invention are connected. Fig. 2 illustrates an under side view of one of the cups. Fig. 3 illustrates a section of the cup shown in Fig. 2.

The cups may be connected to any suitable object that is to be pneumatically attached to a supporting surface. In the illustration of Fig. 1 wherein a practical application of the invention is shown, the cups I are connected to a luggage rack. The vacuum cups are particularly adapted to connect the rack to the top of the body of an automobile where the corner parts of the automobile body are formed rounded and sloping relative to the major part of the top. The cups are connected to the frame 3 so as to locate their edges in planes that substantially conform to the general direction of the sloping areas of the rounded corners of the top of the automobile. The cups are connected by brackets 8 to the tubular uprights 7 which are connected to the frame 3. The interiors of the cups communicate with the interior of the frame through the passageways 9 formed in the brackets 8 and tubular uprights 7. The brackets 8 and the tops of the cups are formed to dispose the plane of the edges of the cups at the desired angle with respect to the plane of the top of the automobile or the frame 3. The bottom of the rack 4 may be suspended from the tubular frame by means of straps 5 that may be suitably secured to the bottom and may be hooked or otherwise connected to the tubular frame 3. The frame 3 may be connected by a pipe 16 to any suitable means, such as the intake of the automobile engine, for exhausting the air from the frame and withdrawing air from the interior of the cups.

The cups I are formed of elastic material, such as rubber vulcanized to the proper degree to produce reasonable resiliency. The cups I are provided with cylindrical hubs 11, the axis of the exterior cylindrical surface of the hubs being located in inclined relation with respect to the plane of the edge 12 of the cup. The hub is provided with a bushing 13 having flange parts 14. The bushing and the lower end of the bracket 8 are threaded to enable connection of the cup with the bracket. The flange parts and the body of the bushing are embedded in the rubber of the hub to produce a rigid connection in the resilient material of which the cup is formed. If desired, to prevent the return flow of the air from the cups to the frame 3, particularly when the engine of the automobile is not running, one-way valves 17 may be located in the hubs 11.

Each of the cups is provided with a plurality of ridges that protrude from the concave surface of the top wall 18 of the cup. The ridges are disposed around a central part or axis of the cup body and are located in spaced relation to each other. The outermost ridge 21 is peripherally located and forms the edge of the elastic cup so as to contact the supporting surface and elastically press the edge of the cup against the supporting surface when the cup is depressed. The contiguous ridge 22 is the air-sealing ridge of the cup, and when the cup is depressed and a material part of the air is exhausted, the ridge 22 is pneumatically pressed against the supporting surface and air-seals the area of the supporting surface surrounded by the ridge 22 and the space between the top wall 18 and the supporting surface.

A vent is located intermediate the sealing ridge 22 and the edge of the cup to prevent removal of air from beneath the marginal part of the top wall of the cup which prevents entrance of moisture beneath the edge of the cup by the low pressure produced within the cup. The edge of the cup is pressed by the elasticity of the top wall against the supporting surface. The engagement of the edge of the cup with the supporting surface shelters the sealing ridge and consequently maintains the effectiveness thereof. The ridge 21, or the edge of the cup, is provided with an opening or recess 23 disposed at the surface engaging edge of the cup for the admission of the air intermediate the ridge 21 and the ridge 22. The recess 23 also forms a vent permitting the escape of water that may enter between the ridge 21 of the cup and the supporting surface. Ordinarily the water capillarily clings to the smaller spaces or cracks formed by the rounded surface of the ridge or edge of the cup where it contacts the supporting surface. If the water enters beneath the edge, it adheres thereto and flows along the edge of the cup and passes out through the vent. When the cup is depressed so that the ridge 22 contacts the supporting surface, the ridge 21 is maintained against the supporting surface by the pressure produced by the resiliency of the rubber of which the cup is formed. If air enters the cup from beneath the ridge 22, it passes through the moisture sheltered vent and into the space between the ridges 21 and 22 and does not draw the moisture into the space defined by the ridge 22 and the top of the cup. The ridge 21 thus operates to shelter the ridge 22 against the entrance of moisture and prevents collection of water, sediment, and dust in the cup. The ridge 21 thus maintains pneumatic efficiency.

The cup cavity is also provided with a plurality of ridges 26, 27, and 28 that are located within the area of the sealing ridge 22. The ridges 26, 27, and 28 are provided with recesses 30 that form passageways that interconnect the spaces between the sealing ridge 22 and the ridges 26, 27, and 28 with the central part of the cup. The ridges 26, 27, and 28 operate to maintain the top wall 18 of the cup in spaced relation with respect to the supporting surface and thus maintain a maximum area of differential pressure on opposite sides of the top wall of the cup within the area of the sealing ridge 22. The ridges prevent contact of the top wall of the cup located within the area of the sealing ridge with the supporting surface, which otherwise would very materially reduce the effective differential pressure.

If desired, the cup may be provided with a suitable reinforcing ridge 32 that may protrude from the outer surface of the top wall. The ridge 32 is located opposite the valley disposed intermediate the ridges 26 and 27 and increases the rigidity particularly at the point where the ridges 26 and 27 are recessed and prevents the portions of the rubber of which the cup is formed from being drawn inwardly to restrict the passageways 30 formed in the ridges 26 and 27.

I claim:

1. In a vacuum cup for securing an object to a supporting surface, a plurality of coaxially arranged ridges located in spaced relation, an outer ridge forming an air-sealing ridge, and each ridge inwardly of said outer ridge having vent means interconnecting the spaces between the said ridges.

2. In a vacuum cup for securing an object to a supporting surface, the cup having an elastic top wall and a plurality of substantially coaxially arranged ridge parts for supporting the top wall in spaced relation with respect to the supporting surface and, except for an outer ridge, having passageways therethrough, said outer ridge being complete and spaced inwardly from the edge of the cup and pneumatically pressed against the supporting surface to air-seal the interior of the cup, the edge of the cup having a vent and elastically pressed against the supporting surface when said outer ridge engages the supporting surface for shielding the outer ridge from water.

3. In a vacuum cup for securing an object to a supporting surface, the cup having an elastic top wall and a plurality of projections located on the top wall for supporting the top wall in spaced relation with respect to the supporting surface when the cup is depressed and having passageways therebetween, a ridge extending along a marginal area of the top wall and spaced inwardly from the edge of the cup to pneumatically air-seal the interior of the cup, the periphery of the cup having a vent and elastically pressed by the elasticity of the body of the cup against the supporting surface when the cup is depressed.

PERCY Q. WILLIAMS.